(12) United States Patent
Garg et al.

(10) Patent No.: US 12,160,517 B2
(45) Date of Patent: Dec. 3, 2024

(54) METHOD AND SYSTEM FOR GENERATING PROTECTED BIOMETRIC TEMPLATES

(71) Applicant: Tata Consultancy Services Limited, Mumbai (IN)

(72) Inventors: Surabhi Garg, New Delhi (IN); Arun Kumar Jindal, Gurgaon (IN); Rajan Mindigal Alasingara Bhattachar, Bangalore (IN); Srinivasa Rao Chalamala, Hyderabad (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 200 days.

(21) Appl. No.: 18/070,794

(22) Filed: Nov. 29, 2022

(65) Prior Publication Data
US 2023/0216687 A1    Jul. 6, 2023

(30) Foreign Application Priority Data
Jan. 6, 2022    (IN) .............................. 202221000786

(51) Int. Cl.
*H04L 9/32* (2006.01)
*G06V 40/50* (2022.01)
*H04L 9/08* (2006.01)

(52) U.S. Cl.
CPC ............ *H04L 9/3231* (2013.01); *G06V 40/53* (2022.01); *H04L 9/0866* (2013.01)

(58) Field of Classification Search
CPC ..... G06F 21/32; G06F 21/6245; G06V 40/53; H04L 9/0866; H04L 9/3231
See application file for complete search history.

(56) References Cited

U.S. PATENT DOCUMENTS 10,650,379 B2 *  5/2020  Agrawal ................. G10L 17/24
10,873,461 B2 * 12/2020  Gupta ................... H04L 9/3013
10,902,237 B1 *  1/2021  Aggarwal .......... G06V 40/1365
(Continued)

OTHER PUBLICATIONS

Pinto et al., "Secure Triplet Loss for End-to-End Deep Biometrics," (2020).

(Continued)

*Primary Examiner* — Gary S Gracia
(74) *Attorney, Agent, or Firm* — FINNEGAN, HENDERSON, FARABOW, GARRETT & DUNNER LLP

(57) ABSTRACT

The present disclosure provides an efficient system for cancelable biometric template protection which is not available in the conventional systems. Initially, the system receives a biometric template from a user. The biometric template is one of, a face image, a fingerprint, an iris image and a palmprint. Further, a vector embedding is computed based on the biometric template using a pretrained neural network. After computing the vector embedding, a key based permutation is computed based on the vector embedding and a permutation key. The permutation key is generated based on an Identification number (ID) associated with the user using a random number based key generation technique. Finally, a protected biometric template is generated by computing a permuted embedding corresponding to the biometric template based on the key based permutation using a plurality of fully connected layers pretrained using a weight based center triplet loss function.

9 Claims, 7 Drawing Sheets

(56) References Cited

U.S. PATENT DOCUMENTS

| | | | |
|---|---|---|---|
| 11,017,203 B1* | 5/2021 | Aggarwal | G06V 40/1365 |
| 11,250,116 B2* | 2/2022 | Rindal | H04L 9/0825 |
| 11,301,586 B1* | 4/2022 | Poh | G06F 21/6254 |
| 11,496,315 B1* | 11/2022 | Genner | G06K 19/06037 |
| 11,967,173 B1* | 4/2024 | Genner | G06V 40/172 |
| 2018/0046853 A1* | 2/2018 | Ionita | G06F 18/22 |
| 2018/0048645 A1* | 2/2018 | Ionita | G06V 40/172 |
| 2019/0147287 A1* | 5/2019 | Glover | G06V 10/803 |
| | | | 382/209 |
| 2019/0278895 A1* | 9/2019 | Streit | G06V 40/45 |
| 2020/0014541 A1* | 1/2020 | Streit | H04L 63/0861 |
| 2020/0036707 A1* | 1/2020 | Callahan | H04L 67/53 |
| 2020/0044852 A1* | 2/2020 | Streit | G06N 3/08 |
| 2020/0089899 A1* | 3/2020 | Jami | G06N 3/08 |
| 2020/0228336 A1* | 7/2020 | Streit | H04L 9/008 |
| 2020/0259638 A1* | 8/2020 | Carmignani | H04L 9/50 |
| 2020/0285896 A1* | 9/2020 | Huang | G06F 18/21322 |
| 2021/0141896 A1* | 5/2021 | Streit | G06F 21/32 |
| 2021/0211290 A1* | 7/2021 | Jindal | H04L 9/008 |
| 2021/0211291 A1* | 7/2021 | Jindal | H04L 9/3231 |
| 2021/0342432 A1* | 11/2021 | Goldwerger | G06F 21/32 |
| 2022/0012511 A1* | 1/2022 | Rowe | G06V 10/82 |
| 2022/0029987 A1* | 1/2022 | Salter | G09C 1/00 |
| 2022/0103362 A1* | 3/2022 | Chafni | G06V 40/13 |
| 2022/0109574 A1* | 4/2022 | Narumanchi | H04L 9/3242 |

OTHER PUBLICATIONS

Pinto et al., "Secure Triplet Loss: Achieving Cancelability and Non-Linkability in End-to-End Deep Biometrics," IEEE Transactions on Biometrics, Behavior, and Identity Science, 3(2) (2021).

* cited by examiner

METHOD AND SYSTEM FOR GENERATING PROTECTED BIOMETRIC TEMPLATES

PRIORITY CLAIM

This U.S. patent application claims priority under 35 U.S.C. § 119 to: Indian Patent Application No. 202221000786, filed on Jan. 6, 2022. The entire contents of the aforementioned application are incorporated herein by reference.

TECHNICAL FIELD

The disclosure herein generally relates to the field of information security and, more particularly, to a method and system for generating protected biometric templates.

BACKGROUND

Biometric based authentication system is a widely deployed authentication mechanism in many applications. The biometric data includes unique features extracted from the biometric characteristics of users. These unique features constitute the biometric templates which are generally stored in their unprotected form on the database server for authentication purposes. Biometric data, unlike passwords, once compromised, remains compromised forever. Further, the original biometric digital image can be reconstructed from the unprotected biometric templates, which could be misused by the attackers. These concerns emphasize not only the need to protect biometric systems but also with high biometric recognition performance.

Conventionally, the biometric templates are protected using encryption techniques and it needs to be decrypted during matching. Hence there is a chance for security breach during decryption of biometric templates. Some other conventional methods use Homomorphic encryption based protection of biometric templates which performs the biometric comparison on the encrypted templates. The homomorphic encryption provides high security, however computational complexity is too high. Cancelable biometrics is a current approach for protecting biometric templates and the cancelable biometrics should satisfy a set of properties like irreversibility, unlikability and renewability. However, a holistic cancelable biometric template protection system capable of satisfying the said properties is unavailable.

SUMMARY

Embodiments of the present disclosure present technological improvements as solutions to one or more of the above-mentioned technical problems recognized by the inventors in conventional systems. For example, in one embodiment, a method for generating protected biometric templates is provided. The method includes receiving, by one or more hardware processors, a biometric template from a user, wherein the biometric template is one of, a face image, a fingerprint, an iris image and a palmprint. Further, the method includes, computing, by the one or more hardware processors, a vector embedding based on the biometric template, using a pretrained neural network. Furthermore, the method includes computing, via the one or more hardware processors, a key based permutation based on the vector embedding and a permutation key, wherein the permutation key is generated based on an Identification number (ID) associated with the user using a random number based key generation technique. Finally, the method includes generating, via the one or more hardware processors, a protected biometric template by computing a permuted embedding corresponding to the biometric template based on the key based permutation using a plurality of fully connected layers pretrained using a weight based center triplet loss function.

In another aspect, a system for generating protected biometric templates is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a biometric template from a user, wherein the biometric template is one of, a face image, a fingerprint, an iris image and a palmprint. Further, the one or more hardware processors are configured by the programmed instructions to compute a vector embedding based on the biometric template, using a pretrained neural network. Furthermore, the one or more hardware processors are configured by the programmed instructions to compute a key based permutation based on the vector embedding and a permutation key, wherein the permutation key is generated based on an Identification number (ID) associated with the user using a random number based key generation technique. Finally, the one or more hardware processors are configured by the programmed instructions to generate a protected biometric template by computing a permuted embedding corresponding to the biometric template based on the key based permutation using a plurality of fully connected layers pretrained using a weight based center triplet loss function.

In yet another aspect, a computer program product including a non-transitory computer-readable medium having embodied therein a computer program for generating protected biometric templates is provided. The computer readable program, when executed on a computing device, causes the computing device to receive a biometric template from a user, wherein the biometric template is one of, a face image, a fingerprint, an iris image and a palmprint. Further, the computer readable program, when executed on a computing device, causes the computing device to compute a vector embedding based on the biometric template, using a pretrained neural network. Furthermore, the computer readable program, when executed on a computing device, causes the computing device to compute a key based permutation based on the vector embedding and a permutation key, wherein the permutation key is generated based on an Identification number (ID) associated with the user using a random number based key generation technique. Finally, the computer readable program, when executed on a computing device, causes the computing device to generate a protected biometric template by computing a permuted embedding corresponding to the biometric template based on the key based permutation using a plurality of fully connected layers pretrained using a weight based center triplet loss function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
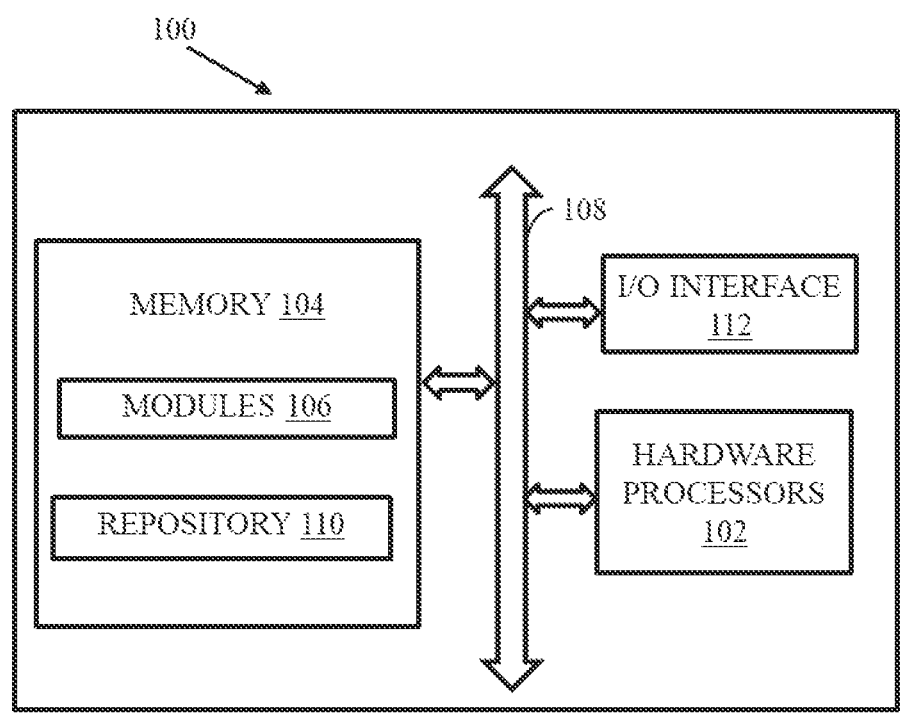
FIG. 1 is a functional block diagram of a system for generating protected biometric templates, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for generating protected biometric templates. Initially, the system receives a biometric template from a user. The biometric template is one of, a face image, a fingerprint, an iris image and a palmprint. Further, a vector embedding is computed based on the biometric template using a pretrained neural network. After computing the vector embedding, a key based permutation is computed based on the vector embedding and a permutation key. The permutation key is generated based on an Identification number (ID) associated with the user using a random number based key generation technique. Finally, a protected biometric template is generated by computing a permuted embedding corresponding to the biometric template based on the key based permutation using a plurality of fully connected layers pretrained using a weight based center triplet loss function.

Referring now to the drawings, and more particularly to FIGS. 1 through 5C, where similar reference characters denote corresponding features consistently throughout the figures, there are shown preferred embodiments and these embodiments are described in the context of the following exemplary system and/or method.

FIG. 1 is a functional block diagram of a system 100 for generating protected biometric templates, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The V/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for generating protected biometric templates. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for generating protected biometric templates. In an embodiment, plurality of modules 106 includes a vector embedding computation module (shown in FIG. 3), a key based permutation module (shown in FIG. 3) and a protected template generation module (shown in FIG. 3).

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 2:
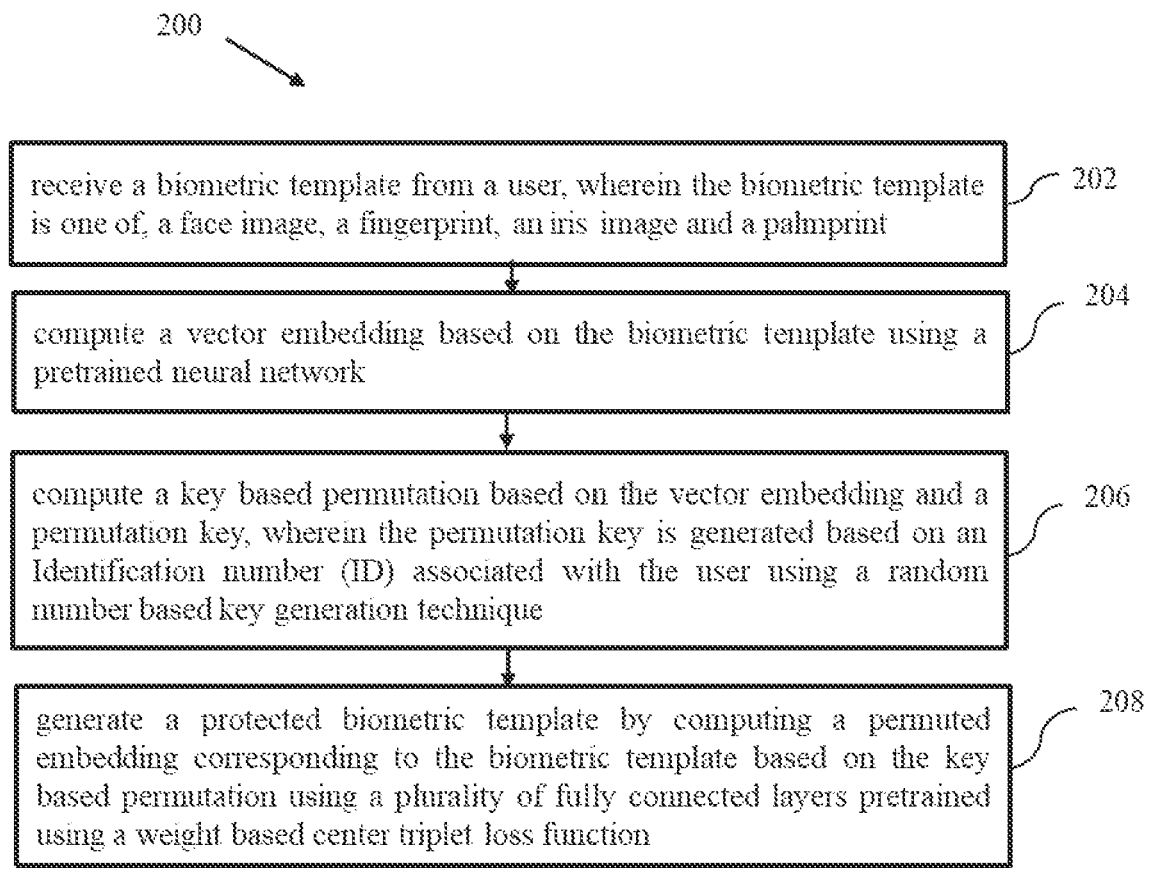
FIG. 2 is an exemplary flow diagram illustrating a method for generating protected biometric templates, implemented by the system of FIG. 1, in accordance with some embodiments of the present disclosure.

FIG. 2 is an exemplary flow diagram illustrating a method 200 for generating protected biometric templates implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive the biometric template from the user, wherein the biometric template is one of, a face image, a fingerprint, an iris image and a palmprint.

At step 204 of the method 200, the vector embedding computation module executed by the one or more hardware processors 102 is configured by the programmed instructions to compute the vector embedding based on the biometric template using a pretrained neural network. The format of the vector embedding is as given in equation (1). For example, the pretrained neural network is a Residual Network (ResNet). In an embodiment, the ResNet is trained using VGGFace2 dataset for facial biometric templates. The VGGFace2 data set used for face recognition across pose and age. Similarly, the ResNet is trained with datasets for fingerprint, palmprint and iris biometrics based on the corresponding application. For example, the vector embedding of a biometric template computed using the ResNet is [0.012, 0.065, 0.091, 0.242, 0.012, 0.004, 0.175 . . . 0.025].

$$y=\{y_1, y_2, \ldots, y_{(d-1)}, y_d\} \quad (1)$$

At step 206 of the method 200, the key based permutation module executed by the one or more hardware processors 102 is configured by the programmed instructions to compute the key based permutation based on the vector embedding and the permutation key. The key based permutation is as given in equation (2) and the general format of the key is given in equation (3).

$$y_K = \{y_{K_1}, y_{K_2}, \ldots, y_{K_{(d-1)}}, y_{K_d}\} \quad (2)$$

$$K = \begin{pmatrix} 1 & \cdots & d \\ \vdots & \ddots & \vdots \\ k_1 & \cdots & k_d \end{pmatrix} \quad (3)$$

In an embodiment, the permutation key is generated based on an Identification number (ID) associated with the user using a random number based key generation technique. For example, if the vector embedding is [0.012, 0.065, 0.091, 0.242, 0.012, 0.004, 0.175 . . . 0.025] and if the key is [27, 0, 1971, 340, 53, 77, 1600, 1 . . . , 5], then the vector embedding is shuffled according to the index positions mentioned in the key to get the corresponding key based permuted embedding like [0.062, 0.012, 0.025, 0.005, 0.076, 0.034, 0.065, . . . , 0.004]. For example, the first element in the permuted embedding, ie. 0.012, is equal to the $0^{th}$ element of the original vector embedding.

Figure 4:
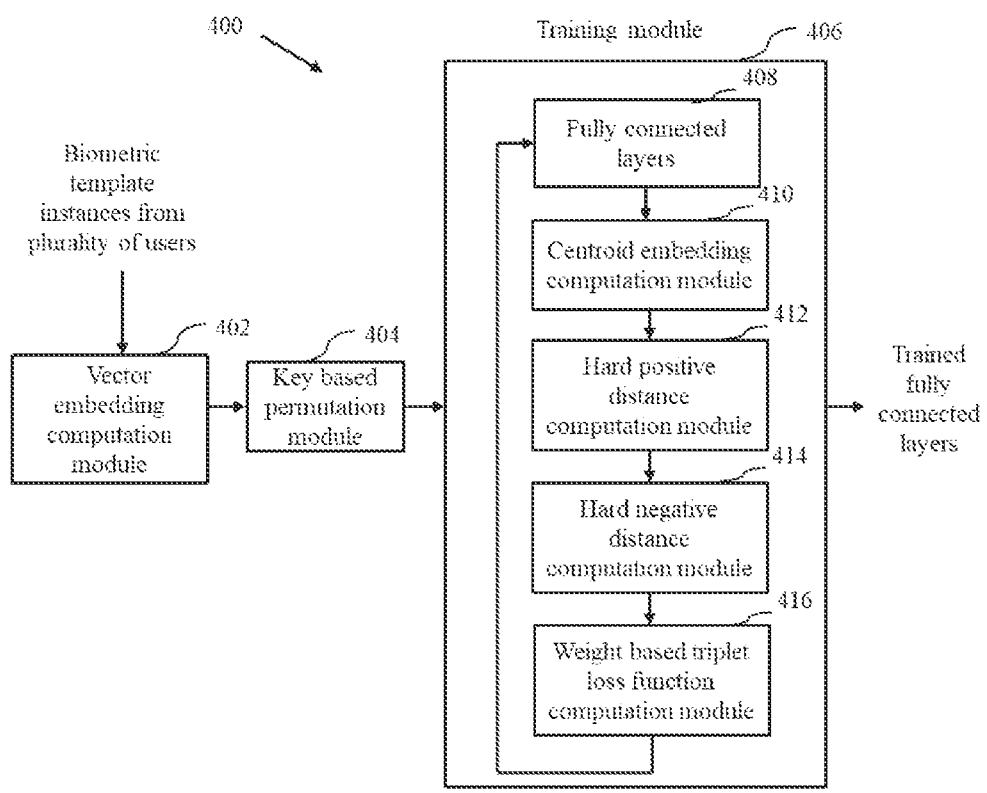
FIG. 4 is a functional architecture for training a plurality of fully connected layers for the processor implemented method for generating protected biometric templates implemented by the system of FIG. 1, in accordance with some embodiments of the present disclosure.

At step 208 of the method 200, the protected template generation module executed by the one or more hardware processors 102 is configured by the programmed instructions to generate the protected biometric template by computing the permuted embedding corresponding to the biometric template based on the key based permutation using the plurality of fully connected layers pretrained using the weight based center triplet loss function (shown in FIG. 4).

In an embodiment, the method of training the plurality of fully connected layers using the weight based centre triplet loss function is explained below. Initially, a plurality of biometric instances corresponding to each of a plurality of biometric templates from a plurality of users are received. The plurality of biometric templates includes the face image, the fingerprint, the iris image and the palmprint. Further, a plurality of vector embeddings corresponding to each of the plurality of users are computed based on the plurality of biometric instances using the pretrained neural network, for example, ResNet. The vector embedding is computed for each of the plurality of biometric instances. Post computing the plurality of vector embeddings, a plurality of key based permutations corresponding to each of the plurality of users are computed based on the corresponding plurality of vector embedding and a corresponding permutation key. The corresponding permutation key is generated based on the Identification number (ID) associated with the corresponding user using the random number based key generation technique. In an embodiment, the random number based key generation technique is a pseudo random number generator.

In an embodiment, the random number based key generation is performed as follows. The user ID is given as an initial seed to pseudo random number generator and a random sequence of natural numbers with a length equal to d are generated. The random sequence represents the key. Here, d represents the dimension of vector embedding obtained from the underlying base network (ResNet) used for pre-training the network.

After computing the plurality of key based permutations corresponding to each of the plurality of users, the the plurality of fully connected layers are trained using the weight based centre triplet loss function. A plurality of permuted embeddings corresponding to each of the plurality of users are computed based on the corresponding plurality of key based permutations using the plurality of fully connected layers. A centroid embedding corresponding to each of the plurality of users is computed based on the corresponding plurality of permuted embeddings using a statistical mean technique. The centroid embedding is represented in equation (4). Now referring to equation (4), $\hat{y}_a$ is the centroid embedding, M is the number of users or classes, $\hat{y}_a^i$ is the permuted embedding of the corresponding class. $ID_{y_a}$ is the ID of the corresponding class, $ID_{y_+}$ is the ID of the positive class (Here, positive class is the corresponding class or user). The term class indicates a user. A positive class indicates a matching user and a negative class indicates non-matching users. Here the where $ID_{y_a} = ID_{y_+} = p$ indicates that the centroid belongs to the same positive class. Here p and q denotes two different classes or users.

$$\hat{y}_a = \frac{1}{M} \sum_{i=1}^{M} y_a^i, \text{ where } ID_{y_a} = ID_{y_+} = p \qquad (4)$$

Further, a hard positive distance corresponding to each of the plurality of users is obtained based on the corresponding centroid embedding and the corresponding plurality permuted embeddings. For example, a squared Euclidean distance can be computed. The hard positive distance is a maximum distance between the corresponding centroid embedding and each of the plurality of permuted embeddings of the corresponding user. The hard positive distance is represented in equation (5). Now referring to equation (5), $\hat{y}_{a,K_p}^P$ is the centroid permuted with the key $K_p$ and $\hat{y}_{+,K_p}^P$ denotes the $i^{th}$ positive user or class sample permuted using the key $K_p$.

$$d_{pos} = \max_{1 \leq i \leq M} d\left(\hat{y}_{a,K_p}^p, y_{+,K_p}^{p,i}\right), ID_{y_a} = ID_{y_+} = p \qquad (5)$$

Further, a hard negative distance corresponding to each of the plurality users is computed based on the corresponding centroid embedding, a plurality of public keys and a plurality of negative centroid embeddings. The hard negative distance is a minimum distance between the corresponding centroid embedding and each of a plurality of negative centroid embeddings corresponding to each of the plurality of users. For example, the plurality of negative centroid embeddings of a user are a plurality of centroid embeddings other than the centroid embedding of the corresponding user. The hard negative distance is given in equation (6).

$$d_{neg} = \min(w_1 * d_{sn} + w_2 * d_{dn} + w_3 * d_{dn1})/3, (w_4 * d_{dp} + w_5 * d_{dp1}))/2) \qquad (6)$$

$$d_{sn} = d(\hat{y}_{a,K_p}^P, \hat{y}_{-,K_p}^q) \qquad (7)$$

$$d_{dn1} = d(\hat{y}_{a,K_p}^P, \hat{y}_{-,K1_p}^q) \qquad (8)$$

$$d_{dn2} = d(\hat{y}_{a,K_p}^P, \hat{y}_{-,K''_p}^q) \qquad (9)$$

$$d_{dp} = d(\hat{y}_{a,K_p}^P, \hat{y}_{+,K'_p}^P) \qquad (10)$$

$$d_{dp1} = d(\hat{y}_{a,K_p}^P, \hat{y}_{+,K''_p}^q) \qquad (11)$$

In an embodiment, the hard negative as given in equation (6) is computed as follows: Initially, a plurality of first negative centroid embeddings (given in equation (7)) corresponding to each of the plurality of users are identified by comparing the key associated with each of the plurality of centroid embeddings $\hat{y}_{a,K_p}^P$, and the key associated with each of the corresponding plurality of negative centroid embeddings $\hat{y}_{-,K_p}^q$. Here, $K_p$ is the key. The plurality of negative centroid embeddings permuted using the key $K_p$ equal to the same key $K_p$ used for permuting the corresponding centroid embedding are identified. Further, a first hard negative distance ($d_{sn}$) is obtained by comparing a distance between the corresponding centroid embedding $\hat{y}_{a,K_p}^P$ and each of the plurality of first negative centroid embeddings $\hat{y}_{-,K_p}^q$. A minimum distance is selected as the first hard negative distance ($d_{sn}$). In an embodiment, training the present disclosure with the first hard negative distance ($d_{sn}$) helps to consider zero effort attack and hence the present disclosure is robust to the zero effort attack.

Further, a plurality of second negative centroid embeddings ($\hat{y}_{-,K'_p}^q$ and $\hat{y}_{-,K''_p}^q$) corresponding to each of the plurality of users are computed by comparing the key associated with each of the plurality of centroid embeddings $\hat{y}_{a,K_p}^P$ (here $K_p$ is the key) and the plurality of keys associated with the corresponding plurality of negative centroid embeddings $\hat{y}_{-,K'_p}^q$ (here $K'_p$ is the key). The corresponding centroid embedding permuted using the key $K_p$ not equal to the plurality of public keys ($K'_p$ and $K''_p$) used for permuting the plurality of negative centroid embeddings are identified. Further, a plurality of second hard negative distances ($d_{dn1}$ and $d_{dn2}$) corresponding to each of the plurality of public keys are obtained by comparing the distance between the corresponding centroid embedding $\hat{y}_{a,K_p}^P$ and each of the plurality of second negative centroid embeddings, wherein the minimum distance is selected as the second hard negative distance. Here $\hat{y}_{-,K'_p}^q$ is associated with the first public key from the plurality of keys and $\hat{y}_{-,K''_p}^q$ is associated with the first public key from the plurality of keys. Similarly, the plurality of second hard negative distances can be extended based on a number of corresponding public keys. In an embodiment, the plurality of second hard negative distances ($d_{dn1}$ and $d_{dn2}$) provides inter-class robustness between each of the plurality of users.

Further, a plurality of third negative centroid embeddings ($\hat{y}_{+,K'_p}^P$ and $\hat{y}_{+,K''_p}^P$) corresponding to each of the plurality of users are identified by comparing the key associated with the corresponding centroid of the user and a plurality of keys ($K'_p$ and $K''_p$) associated with a plurality of extended centroids of the same user. The corresponding centroid of the user is the centroid embedding of the user permuted using the corresponding key of the user. Each of the plurality of extended centroids of the same user is the centroid embedding of the user permuted using a plurality of keys not equal to the corresponding key of the user. For example, if a user is enrolled in biometric authentication system of more than one organization, the ID number will vary and hence there is a chance for permuting the template of a same user with more than one keys. In such cases, the two permuted embeddings of the two user should be treated as different. This solves the unlinkability problem. Further, a plurality of third hard negative distances ($d_{dp}$ and $d_{dp1}$) are obtained between the corresponding centroid embedding $\hat{y}_{a,K_p}^P$ and the plurality of third negative centroid embeddings ($\hat{y}_{+,K'_p}^P$ and $\hat{y}_{+,K''_p}^P$). The plurality of third negative distances corresponds to the plurality of keys and this distance computation can be extended based on the number of keys.

Further, the hard negative distance is computed based on the first hard negative distance $d_{sn}$, the plurality of second hard negative distances ($d_{dn}$ and $d_{dn1}$), the plurality of third hard negative distances ($d_{dp}$ and $d_{dp1}$) and the plurality of weights associated with the hard negative distance as given in equation (6). Now referring to equation (6), $w_1$ is the weight associated with the first hard negative distance $d_{sn}$, $w_2$ is the weight corresponding to second hard negative distance $d_{dn}$, $w_3$ is the weight corresponding to second hard negative distance $d_{dn1}$, $w_4$ is the weight corresponding to the third hard negative distance $d_{dp}$ and $w_5$ is the weight corresponding to the third hard negative distance $d_{dp1}$. In an embodiment, since there is a higher possibility of zero effort attacks, the weight $w_1$ is given high value. Similarly, each of the plurality of weights are customized based on the application. For example, $w_1=0.5$, $w_2=0.2$, $w_3=0.2$, $w_4=0.5$ and $w_5=0.5$.

In an embodiment, a triplet is obtained for each of the plurality of users, wherein the triplet comprises the corresponding centroid embedding, a hard positive centroid and a hard negative centroid corresponding to each of the plurality of users. The hard positive centroid is the positive centroid of the same user which is located in a maximum distance. the negative centroid is a non-matching centroid of the corresponding user located in a minimum distance.

Further, a weight based center triplet loss function is computed based on the hard positive distance corresponding to each of the plurality of users, the hard negative distance corresponding to each of the plurality of users, a number of users and a plurality of weights associated with the hard negative distance as given in equation (12). Now referring to equation (12), $d_{pos}$, is given in equation (5) and $d_{neg}$ is given in equation (6). Here, $\propto$ and 0 are hyperparameters.

$$L_{proposed} = \frac{1}{P}\sum_{p=1}^{P} \max[d_{pos} - d_{neg} + \propto, 0] \quad (12)$$

Further, the plurality of fully connected layers are trained based on the weight based center triplet loss function until a minimum loss is obtained.

Figure 3:
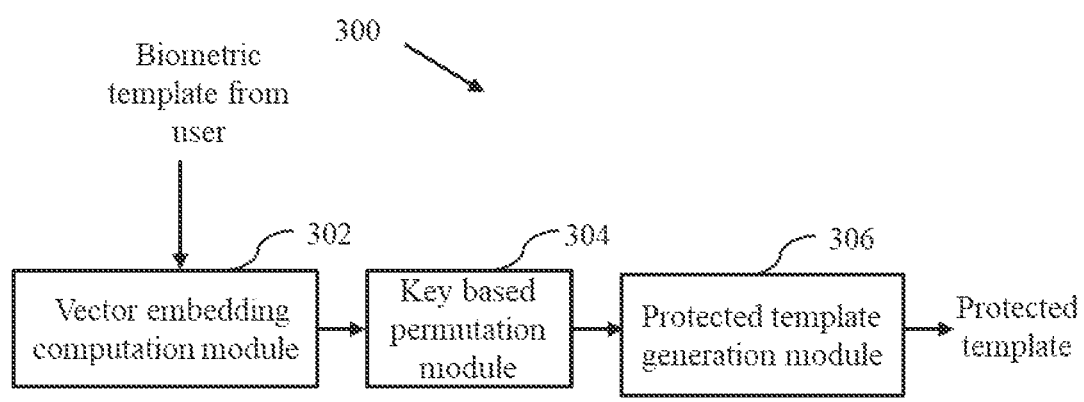
FIG. 3 illustrates an overall functional architecture for a processor implemented method for generating protected biometric templates, in accordance with some embodiments of the present disclosure.

In an embodiment, FIG. 3 illustrates an overall functional architecture for the processor implemented method for generating protected biometric templates, in accordance with some embodiments of the present disclosure. Now referring to FIG. 3, the method 300 includes a vector embedding computation module 302, a key based permutation module 304 and a protected template generation module 306. The vector embedding computation module 302 receives the biometric template from the user and computes the vector embedding based on the biometric template using the pretrained neural network like ResNet. The key based permutation module 304 computes the key based permutation based on the vector embedding and the permutation key. The permutation key is generated based on the Identification number (ID) associated with the user using the random number based key generation technique. The protected template generation module 306 generates the protected biometric template by computing the permuted embedding corresponding to the biometric template based on the key based permutation using the plurality of fully connected layers pretrained using the weight based center triplet loss function.

FIG. 4 is a functional architecture for training a plurality of fully connected layers for the processor implemented method for generating protected biometric templates implemented by the system of FIG. 1, in accordance with some embodiments of the present disclosure. Now referring to FIG. 4, the functional architecture includes a vector embedding computation module 402, a key based permutation module 404 and a training module 406. The vector embedding computation module 402 receives the plurality of biometric instances corresponding to each of the plurality of biometric templates from a plurality of users and computes the plurality of vector embeddings corresponding to each of the plurality of users based on the plurality of biometric instances using the pretrained neural network. The vector embedding is computed for each of the plurality of biometric instances. The plurality of biometric templates comprises the face image, the fingerprint, the iris image and the palmprint.

The key based permutation module 404 computes a plurality of key based permutations corresponding to each of the plurality of users based on the corresponding plurality of vector embedding and a corresponding permutation key. The permutation key is generated based on the Identification number (ID) associated with the user using the random number based key generation technique. The training module 406 includes a plurality of fully connected layers 408 to compute the plurality of vector embeddings, a centroid embedding computation module 410, a hard positive distance computation module 412, a hard negative distance computation module 414 and a weight based triplet loss function computation module 416.

In an embodiment, the plurality of fully connected layers 408 computes the plurality of permuted embeddings corresponding to each of the plurality of users based on the corresponding plurality of key based permutations using the plurality of fully connected layers. The centroid embedding computation module 410 computes a centroid embedding corresponding to each of the plurality of users based on the corresponding plurality of permuted embeddings using the statistical mean technique. The hard positive distance computation module 412 computes the hard positive distance $d_{pos}$ as given in equation (5). The hard negative distance computation module 414 computes the hard negative distance $d_{neg}$ as given in equation (6) and a weight based triplet loss function computation module 416 computes the weight based center triplet loss function $L_{proposed}$ as given in equation (12).

In an embodiment, the present disclosure is experimented with face biometric template. During training phase, the network parameters are initialized for the base network (Inception-Resnet-v1) which is pre-trained on the VGG-Face2 dataset. The original fully connected layers were replaced with two fully connected layers, i.e. a first fully connected layer, and a second fully connected layer, with 100 units each and ReLU (Rectified Linear Unit) activation. The output of the average pool layer just before the first fully connected layer provides the face embeddings with 1792 dimensions. Further, the key based permutation is performed on the embedding received as an output from the average pool layer (just before the first fully connected layer). Since the face embedding is of 1792 dimension, the random permutation sequence of the same dimension is generated. The keys that are used to generate the permutation sequence are randomly generated for each class/subject. The permuted embeddings of 1792 dimensions are passed through the fully connected layers to generate the final protected embedding of 100 dimension. The model is optimized by training the evaluated datasets with the proposed modified center triplet loss function. A maximum of 200 epochs with an early stopping at 50 epochs are considered in this experimentation. Further, an empirically computed margin $\propto$ is set as $\propto=0.8$. The initial learning rate is $1e^{-4}$ and l2 regularization=0.001. In an embodiment, 20% of the data training dataset is used as part of the validation set.

Further, the present disclosure is evaluated as follows: In an embodiment, 10 random triplets were considered to be generated from each of the training and testing identity. The triplets generated included an anchor (center of positive class), a negative (center of negative class) and a positive sample. The number of training and testing triplets generated is exactly equal to the number of classes or the number of users. Since the present disclosure constructs centroids of classes, 4 samples from each identity is considered to compute the mean that defines the center of a particular class. For evaluation on the test dataset, the test triplets include a center of class (representing the anchor or centroid), a positive sample and a negative sample.

The present disclosure is evaluated for achieving a plurality of parameters including inter-class robustness, computation efficiency, secrecy leakage rate, unlinkability, irreversibility and renewability.

Inter-class robustness: In order to obtain, intra-class robustness, the samples or biometric instances of a particular user or a class are permuted using the same key. Whereas, for two different subjects, two different permutation keys are used. It ensures that the overall distribution of face embeddings in a particular class remains same after the permutation that preserves the intra-class robustness. At the same time, the permutation of two samples (belonging to the two different users) using two different keys randomly shuffle their overall distribution in the respective face embeddings. It helps to achieve better inter-class robustness. performance over the unprotected face embedding.

Computing efficiency: Since the present disclosure consider only the hardest positive and hardest negative sample for a particular anchor or centroid, the total number of triplets generated in a mini-batch during training would be N, where N represents the number of classes. For each class, is only 1 anchor representing the center of the class, 1 positive which is denoted by the farthest sample from the anchor, and 1 negative denoted by the center of the nearest negative class. Hence the computation cost is less when compared to the conventional methods.

In an embodiment, for the FEI dataset, the training time taken on an average of over 25 runs for 200 epochs without early stopping is computed for an i7 processor with 16 GB RAM, GeForce GTX 1070, 8 GB GPU card and 2.20 GHz CPU clock frequency. The empirical results shows that the training time is almost 7 times faster for the present disclosure compared to the conventional methods. Further, the accuracy of matching of the present disclosure is 10 times faster than the conventional methods.

Unlinkability: If two protected face embeddings belong to the mated or non-mated samples distribution should be infeasible. Mated samples denote the enrolled and the genuine samples across different applications. Non-mated samples represent the enrolled and impostor samples across different applications. Here, the different application focuses on using a different key or a security parameter for template protection. In general, unlinkability is measured by two measures. One is the local measure $D_{(s)}$ which evaluates the score-wise linkability between the two templates. Another measure is a global measure $D_{sys}$, which measures the linkability of the overall system.

It is observed that with the integration of linkability in the secure triplet loss function with more weightage on the linkability factor, the equal error rate increases significantly. No additional linkability measure is included in present disclosure while computing the loss during training. Hence, the recognition performance of the overall system remains unaffected.

Figure 5A:
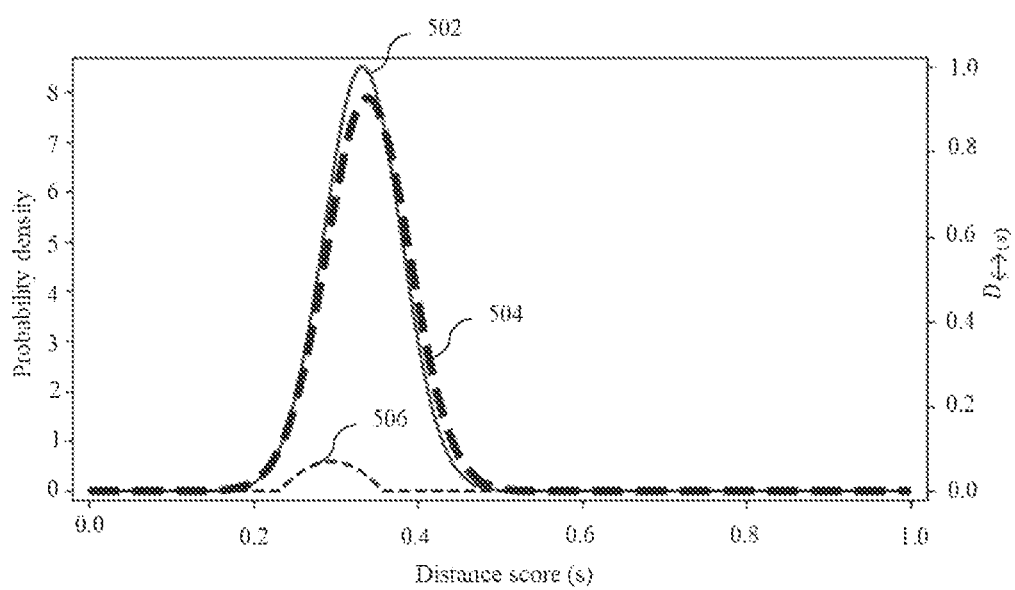
FIGS. 5A through 5C illustrates experimental results depicting performance of the processor implemented method for generating protected biometric templates implemented by the system of FIG. 1, in accordance with some embodiments of the present disclosure.
Figure 5B:
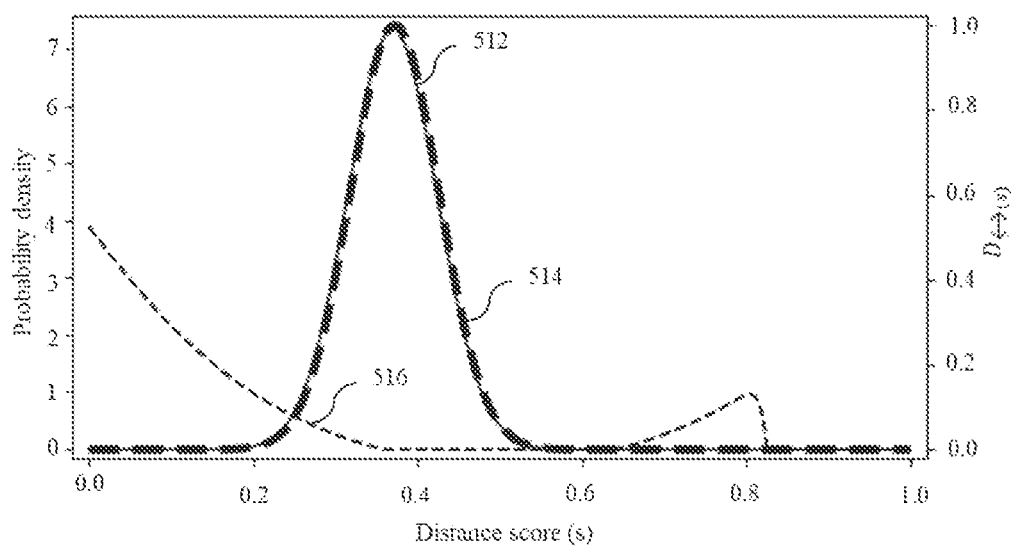
Figure 5C:
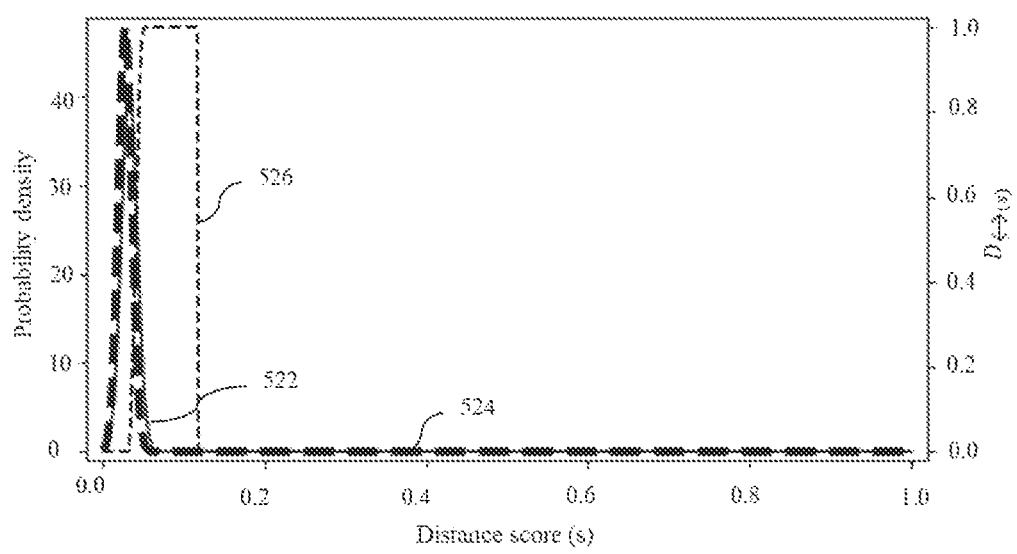

FIGS. 5A through 5C illustrate experimental results depicting performance of the processor implemented method for generating protected biometric templates implemented by the system of FIG. 1, in accordance with some embodiments of the present disclosure.

Now referring to FIGS. 5A through 5C, the graphs demonstrates the distribution of the mated and non-mated samples plotted by using the dissimilarity scores obtained by comparing two face embeddings for the YouTube (FIG. 5A), FEI (FIG. 5B) and CFP (FIG. 5C) datasets. Now referring to FIG. 5A, the distributions of the mated samples 502 and non-mated samples 504 are almost overlapping with each other and the global linkability measure $D_{sys}$ 506 is approximately zero in the case of YouTube dataset. The global linkability value of the present disclosure for YouTube dataset is $D_{sys}$=[0.03]. Now referring to FIG. 5B, the distributions of the mated samples 512 and non-mated samples 514 for the FEI dataset are overlapping and the global linkability value is for the YouTube database 516 is given as $D_{sys}$=[0.09]. Now referring to FIG. 5C, the distributions of the mated samples 522 and non-mated samples 524 are overlapping for CFP database and the global linkability value 526 is $D_{sys}$,=[0.23]. Hence it is evident that the present disclosure achieves unlinkability by using different keys across different applications for each user.

Irreversibility analysis: The irreversibility is computed in terms of privacy leakage rate and is denoted as given in equation (13)

$$\frac{H(x/y_k)}{H(x)} = 1 - \frac{I(x; y_k)}{H(x)} \qquad (13)$$

where x is the input face image, $y_k$ denotes the protected face embedding, H(x) denotes the entropy of x with $H(x/y_k)$ as the conditional entropy and $I(x; y_k)$ as the mutual information. Ideally, the privacy leakage rate should be close to 1, which means given $y_K$, it is infeasible to get information about x. The entropy measures including the entropy, conditional entropy and mutual information. The present disclosure obtained $I(x; y_k)$=0, which means the privacy leakage rate is 1. It shows that an attacker cannot recover the original face image x, given a compromised protected face embedding.

Secrecy leakage rate: The secrecy leakage rate measures how much information about the protected templates is revealed. It is computed from the corresponding keys. Since public keys are used in the present disclosure, the keys should not disclose any significant information about the protected embeddings. The secrecy leakage rate is measured using the mutual information metrics. The ideal secrecy leakage for the present disclosure is 0.

Renewability analysis: Renewability depends on the size of the parameter used to transform the original face embedding to the protected face embedding. The present disclosure uses a public key to permute the face embedding to generate the protected embedding. If the protected template is compromised, a new user-specific key would be allotted to generate the new protected embedding. A maximum of 1792! unique, random sequences (denoting the key space) can be randomly generated for a face embedding of dimension 1792 to permute the face embeddings which is quite a large key space.

In an embodiment, the present disclosure can be used for authenticating the user. The method of authenticating the user based on the protected biometric templates is explained as follows: Initially the biometric template is received from the user. Further, the vector embedding is computed based on the biometric template using the pretrained neural network (ResNet). Further, the key based permutation is computed based on the vector embedding and the permutation key. The permutation key is generated based on the ID associated with the user using the random number based key generation technique. Further, the protected biometric template is generated by computing the permuted embedding corresponding to the biometric template based on the key based permutation using the plurality of fully connected layers pretrained using the weight based center triplet loss function. Finally, the user is authenticated based on a comparison between the computed permuted embedding of the user and a plurality of precomputed permuted embeddings stored in a database.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of generating protected biometric templates in an accurate and efficient manner. The present disclosure provides an end-to-end cancelable biometric template protection scheme were given a biometric characteristic and a user-specific, public key as inputs, a protected biometric template is generated. The key permutes the biometric embeddings generated from the base network (ResNet). The permuted embeddings are optimized by training the network with modified center triplet loss where the anchor and negative samples are represented by the centers of their respective classes which helps to achieve unlinkability in the system. The modified center triplet loss improves the inter-class robustness of the system while at the same time intra-class robustness is preserved. Further, the present disclosure achieves an overall improvement of 10% in accuracy compared to the conventional approaches. Further, the single triplet generated for each subject during training in the present disclosure significantly reduced the computational cost.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, via one or more hardware processors, a biometric template from a user, wherein the biometric template is one of, a face image, a fingerprint, an iris image and a palmprint;

computing, via the one or more hardware processors, a vector embedding based on the biometric template, using a pretrained neural network;

computing, via the one or more hardware processors, a key based permutation based on the vector embedding and a permutation key, wherein the permutation key is generated based on an Identification number (ID) associated with the user using a random number based key generation technique; and generating, via the one or more hardware processors, a protected biometric template by computing a permuted embedding corresponding to the biometric template based on the key based permutation using a plurality of fully connected layers pretrained using a weight based center triplet loss function;
wherein pretraining the plurality of fully connected layers using the weight based centre triplet loss function comprises:
receiving a plurality of biometric instances corresponding to each of a plurality of biometric templates from a plurality of users, wherein the plurality of biometric templates comprises the face image, the fingerprint, the iris image and the palmprint;
computing a plurality of vector embeddings corresponding to each of the plurality of users based on the plurality of biometric instances using the pretrained neural network, wherein a vector embedding is computed for each of the plurality of biometric instances;
computing a plurality of key based permutations corresponding to each of the plurality of users based on the corresponding plurality of vector embedding and a corresponding permutation key, wherein the corresponding permutation key is generated based on the Identification number (ID) associated with the corresponding user using the random number based key generation technique; and
training the the plurality of fully connected layers based on the plurality of key based permutations corresponding to each of the plurality of users using the weight based centre triplet loss function by:
computing a plurality of permuted embeddings corresponding to each of the plurality of users based on the corresponding plurality of key based permutations using the plurality of fully connected layers;
computing a centroid embedding corresponding to each of the plurality of users based on the corresponding plurality of permuted embeddings using a statistical mean technique;
obtaining a hard positive distance corresponding to each of the plurality of users based on the corresponding centroid embedding and the corresponding plurality permuted embeddings, wherein the hard positive distance is a maximum distance between the corresponding centroid embedding and each of the plurality of permuted embeddings of the corresponding user;
computing a hard negative distance corresponding to each of the plurality users based on the corresponding centroid embedding, a plurality of public keys and a plurality of negative centroid embeddings, wherein the hard negative distance is a minimum distance between the corresponding centroid embedding and each of a plurality of negative centroid embeddings corresponding to each of the plurality of users, wherein the plurality of negative centroid embeddings of a user are a plurality of centroid embeddings other than the centroid embedding of the corresponding user;
computing a weight based center triplet loss function based on the hard positive distance corresponding to each of the plurality of users, the hard negative distance corresponding to each of the plurality of users, a number of users and a plurality of weights associated with the hard negative distance; and
training the plurality of fully connected layers based on the weight based center triplet loss function until a minimum loss is obtained.

2. The processor implemented method of claim 1 further comprises authenticating the user based on a comparison between the computed permuted embedding of a user and a plurality of precomputed permuted embeddings stored in a database.

3. The processor implemented method of claim 1, wherein the method of computing the hard negative distance corresponding to each of the plurality users based on the corresponding centroid embedding, the plurality of public keys, and the plurality of negative centroid embeddings comprises:
identifying a plurality of first negative centroid embeddings corresponding to each of the plurality of users by comparing the key associated with each of the plurality of centroid embeddings and the key associated with each of the corresponding plurality of negative centroid embeddings, wherein the plurality of negative centroid embeddings permuted using the key equal to the key used for permuting the corresponding centroid embedding are identified;
obtaining a first hard negative distance by comparing a distance between the corresponding centroid embedding and each of the plurality of first negative centroid embeddings, wherein a minimum distance is selected as the first hard negative distance;
identifying a plurality of second negative centroid embeddings corresponding to each of the plurality of users by comparing the key associated with each of the plurality of centroid embeddings and the plurality of keys associated with the corresponding plurality of negative centroid embeddings, wherein the corresponding centroid embedding permuted using the key not equal to the plurality of public keys used for permuting the plurality of negative centroid embeddings are identified;
obtaining a plurality of second hard negative distances corresponding to each of the plurality of public keys by comparing the distance between the corresponding centroid embedding and each of the plurality of second negative centroid embeddings, wherein the minimum distance is selected as the second hard negative distance;
identifying a plurality of third negative centroid embedding corresponding to each of the plurality of users by comparing the key associated with the corresponding centroid of the user and a plurality of keys associated with a plurality of extended centroids of the same user, wherein the corresponding centroid of the user is the centroid embedding of the user permuted using the corresponding key of the user, wherein each of the plurality of extended centroids of the same user is the centroid embedding of the user permuted using a plurality of keys not equal to the corresponding key of the user;
obtaining a plurality of third hard negative distance between the corresponding centroid embedding and the plurality of third negative centroid embedding, wherein the plurality of third negative distances corresponds to the plurality of keys; and
computing the hard negative distance based on the first hard negative distance, the second hard negative distance, the third hard negative distance and the plurality of weights associated with the hard negative distance.

4. A system comprising:
at least one memory storing programmed instructions; one or more Input/Output (I/O) interfaces; and one or more hardware processors operatively coupled to the at least one memory, wherein the one or more hardware processors are configured by the programmed instructions to:

receive a biometric template from a user, wherein the biometric template is one of, a face image, a fingerprint, an iris image and a palmprint;

compute a vector embedding based on the biometric template, using a pretrained neural network;

compute a key based permutation based on the vector embedding and a permutation key, wherein the permutation key is generated based on an Identification number (ID) associated with the user using a random number based key generation technique; and generate a protected biometric template by computing a permuted embedding corresponding to the biometric template based on the key based permutation using a plurality of fully connected layers pretrained using a weight based center triplet loss function;

wherein pretraining the plurality of fully connected layers using the weight based centre triplet loss function comprises:

receiving a plurality of biometric instances corresponding to each of a plurality of biometric templates from a plurality of users, wherein the plurality of biometric templates comprises the face image, the fingerprint, the iris image and the palmprint;

computing a plurality of vector embeddings corresponding to each of the plurality of users based on the plurality of biometric instances using the pretrained neural network, wherein a vector embedding is computed for each of the plurality of biometric instances;

computing a plurality of key based permutations corresponding to each of the plurality of users based on the corresponding plurality of vector embedding and a corresponding permutation key, wherein the corresponding permutation key is generated based on the Identification number (ID) associated with the corresponding user using the random number based key generation technique; and training the the plurality of fully connected layers based on the plurality of key based permutations corresponding to each of the plurality of users using the weight based centre triplet loss function by:

computing a plurality of permuted embeddings corresponding to each of the plurality of users based on the corresponding plurality of key based permutations using the plurality of fully connected layers;

computing a centroid embedding corresponding to each of the plurality of users based on the corresponding plurality of permuted embeddings using a statistical mean technique;

obtaining a hard positive distance corresponding to each of the plurality of users based on the corresponding centroid embedding and the corresponding plurality permuted embeddings, wherein the hard positive distance is a maximum distance between the corresponding centroid embedding and each of the plurality of permuted embeddings of the corresponding user;

computing a hard negative distance corresponding to each of the plurality users based on the corresponding centroid embedding, a plurality of public keys and a plurality of negative centroid embeddings, wherein the hard negative distance is a minimum distance between the corresponding centroid embedding and each of a plurality of negative centroid embeddings corresponding to each of the plurality of users, wherein the plurality of negative centroid embeddings of a user are a plurality of centroid embeddings other than the centroid embedding of the corresponding user;

computing a weight based center triplet loss function based on the hard positive distance corresponding to each of the plurality of users, the hard negative distance corresponding to each of the plurality of users, a number of users and a plurality of weights associated with the hard negative distance; and training the plurality of fully connected layers based on the weight based center triplet loss function until a minimum loss is obtained.

5. The system of claim 4 further comprises authenticating the user based on a comparison between the computed permuted embedding of a user and a plurality of precomputed permuted embeddings stored in a database.

6. The system of claim 4, wherein the method of computing the hard negative distance corresponding to each of the plurality users based on the corresponding centroid embedding, the plurality of public keys, and the plurality of negative centroid embeddings comprises:

identifying a plurality of first negative centroid embeddings corresponding to each of the plurality of users by comparing the key associated with each of the plurality of centroid embeddings and the key associated with each of the corresponding plurality of negative centroid embeddings, wherein the plurality of negative centroid embeddings permuted using the key equal to the key used for permuting the corresponding centroid embedding are identified;

obtaining a first hard negative distance by comparing a distance between the corresponding centroid embedding and each of the plurality of first negative centroid embeddings, wherein a minimum distance is selected as the first hard negative distance;

identifying a plurality of second negative centroid embeddings corresponding to each of the plurality of users by comparing the key associated with each of the plurality of centroid embeddings and the plurality of keys associated with the corresponding plurality of negative centroid embeddings, wherein the corresponding centroid embedding permuted using the key not equal to the plurality of public keys used for permuting the plurality of negative centroid embeddings are identified;

obtaining a plurality of second hard negative distances corresponding to each of the plurality of public keys by comparing the distance between the corresponding centroid embedding and each of the plurality of second negative centroid embeddings, wherein the minimum distance is selected as the second hard negative distance;

identifying a plurality of third negative centroid embedding corresponding to each of the plurality of users by comparing the key associated with the corresponding centroid of the user and a plurality of keys associated with a plurality of extended centroids of the same user, wherein the corresponding centroid of the user is the centroid embedding of the user permuted using the corresponding key of the user, wherein each of the plurality of extended centroids of the same user is the centroid embedding of the user permuted using a plurality of keys not equal to the corresponding key of the user;

obtaining a plurality of third hard negative distance between the corresponding centroid embedding and the plurality of third negative centroid embedding, wherein the plurality of third negative distances corresponds to the plurality of keys; and computing the hard negative distance based on the first hard negative distance, the second hard negative distance, the third hard negative distance and the plurality of weights associated with the hard negative distance.

7. One or more non-transitory machine-readable information storage mediums comprising one or more instructions which when executed by one or more hardware processors cause:

receiving a biometric template from a user, wherein the biometric template is one of, a face image, a fingerprint, an iris image and a palmprint;

computing a vector embedding based on the biometric template, using a pretrained neural network;

computing a key based permutation based on the vector embedding and a permutation key, wherein the permutation key is generated based on an Identification number (ID) associated with the user using a random number based key generation technique; and generating a protected biometric template by computing a permuted embedding corresponding to the biometric template based on the key based permutation using a plurality of fully connected layers pretrained using a weight based center triplet loss function;

wherein pretraining the plurality of fully connected layers using the weight based centre triplet loss function comprises:

receiving a plurality of biometric instances corresponding to each of a plurality of biometric templates from a plurality of users, wherein the plurality of biometric templates comprises the face image, the fingerprint, the iris image and the palmprint;

computing a plurality of vector embeddings corresponding to each of the plurality of users based on the plurality of biometric instances using the pretrained neural network, wherein a vector embedding is computed for each of the plurality of biometric instances;

computing a plurality of key based permutations corresponding to each of the plurality of users based on the corresponding plurality of vector embedding and a corresponding permutation key, wherein the corresponding permutation key is generated based on the Identification number (ID) associated with the corresponding user using the random number based key generation technique; and training the the plurality of fully connected layers based on the plurality of key based permutations corresponding to each of the plurality of users using the weight based centre triplet loss function by:

computing a plurality of permuted embeddings corresponding to each of the plurality of users based on the corresponding plurality of key based permutations using the plurality of fully connected layers;

computing a centroid embedding corresponding to each of the plurality of users based on the corresponding plurality of permuted embeddings using a statistical mean technique;

obtaining a hard positive distance corresponding to each of the plurality of users based on the corresponding centroid embedding and the corresponding plurality permuted embeddings, wherein the hard positive distance is a maximum distance between the corresponding centroid embedding and each of the plurality of permuted embeddings of the corresponding user;

computing a hard negative distance corresponding to each of the plurality users based on the corresponding centroid embedding, a plurality of public keys and a plurality of negative centroid embeddings, wherein the hard negative distance is a minimum distance between the corresponding centroid embedding and each of a plurality of negative centroid embeddings corresponding to each of the plurality of users, wherein the plurality of negative centroid embeddings of a user are a plurality of centroid embeddings other than the centroid embedding of the corresponding user;

computing a weight based center triplet loss function based on the hard positive distance corresponding to each of the plurality of users, the hard negative distance corresponding to each of the plurality of users, a number of users and a plurality of weights associated with the hard negative distance; and training the plurality of fully connected layers based on the weight based center triplet loss function until a minimum loss is obtained.

8. The one or more non-transitory machine-readable information storage mediums of claim 7 further comprises authenticating the user based on a comparison between the computed permuted embedding of a user and a plurality of precomputed permuted embeddings stored in a database.

9. The one or more non-transitory machine-readable information storage mediums of claim 7, wherein the method of computing the hard negative distance corresponding to each of the plurality users based on the corresponding centroid embedding, the plurality of public keys, and the plurality of negative centroid embeddings comprises:

identifying a plurality of first negative centroid embeddings corresponding to each of the plurality of users by comparing the key associated with each of the plurality of centroid embeddings and the key associated with each of the corresponding plurality of negative centroid embeddings, wherein the plurality of negative centroid embeddings permuted using the key equal to the key used for permuting the corresponding centroid embedding are identified;

obtaining a first hard negative distance by comparing a distance between the corresponding centroid embedding and each of the plurality of first negative centroid embeddings, wherein a minimum distance is selected as the first hard negative distance;

identifying a plurality of second negative centroid embeddings corresponding to each of the plurality of users by comparing the key associated with each of the plurality of centroid embeddings and the plurality of keys associated with the corresponding plurality of negative centroid embeddings, wherein the corresponding centroid embedding permuted using the key not equal to the plurality of public keys used for permuting the plurality of negative centroid embeddings are identified;

obtaining a plurality of second hard negative distances corresponding to each of the plurality of public keys by comparing the distance between the corresponding centroid embedding and each of the plurality of second negative centroid embeddings, wherein the minimum distance is selected as the second hard negative distance;

identifying a plurality of third negative centroid embedding corresponding to each of the plurality of users by comparing the key associated with the corresponding centroid of the user and a plurality of keys associated with a plurality of extended centroids of the same user, wherein the corresponding centroid of the user is the centroid embedding of the user permuted using the corresponding key of the user, wherein each of the plurality of extended centroids of the same user is the centroid embedding of the user permuted using a plurality of keys not equal to the corresponding key of the user;

obtaining a plurality of third hard negative distance between the corresponding centroid embedding and the plurality of third negative centroid embedding, wherein the plurality of third negative distances corresponds to the plurality of keys; and computing the hard negative distance based on the first hard negative distance, the second hard negative distance, the third hard negative distance and the plurality of weights associated with the hard negative distance.

* * * * *